J. Tyzick.

Nail Extractor.

No. 3,334. Reissued Mar. 23, 1869.

Witnesses;
A. J. H. Shilton
L. C. Paul

Inventor;
James Tyzick
By his Atty J. Edwin Sherman.

N. PETERS, PHOTO-LITHOGRAPHER, WASHINGTON, D. C.

United States Patent Office.

OHN VREELAND BOGERT, OF NEW YORK, N. Y., AND JOHN F. LOWELL, OF BOSTON, MASSACHUSETTS, ASSIGNEES, BY MESNE ASSIGNMENTS, OF JAMES TYZICK.

*Letters Patent No.* 78,699, *dated June* 9, 1868; *reissue No.* 3,334, *dated March* 23, 1869.

IMPROVEMENT IN NAIL-EXTRACTORS.

The Schedule referred to in these Letters Patent and making part of the same.

*To all whom it may concern:*

Be it known that JAMES TYZICK, of St. John, in the Province of New Brunswick, has invented a new and useful Machine for Extracting Nails; and we, JOHN VREELAND BOGERT, of the city, county, and State of New York, and JOHN F. LOWELL, of Boston, in the county of Suffolk, and State of Massachusetts, do hereby declare that the following is a full, true, and exact description of the construction and operation of the same, reference being had to the accompanying drawings, making a part of this specification, in which—

Figures 1, 2:
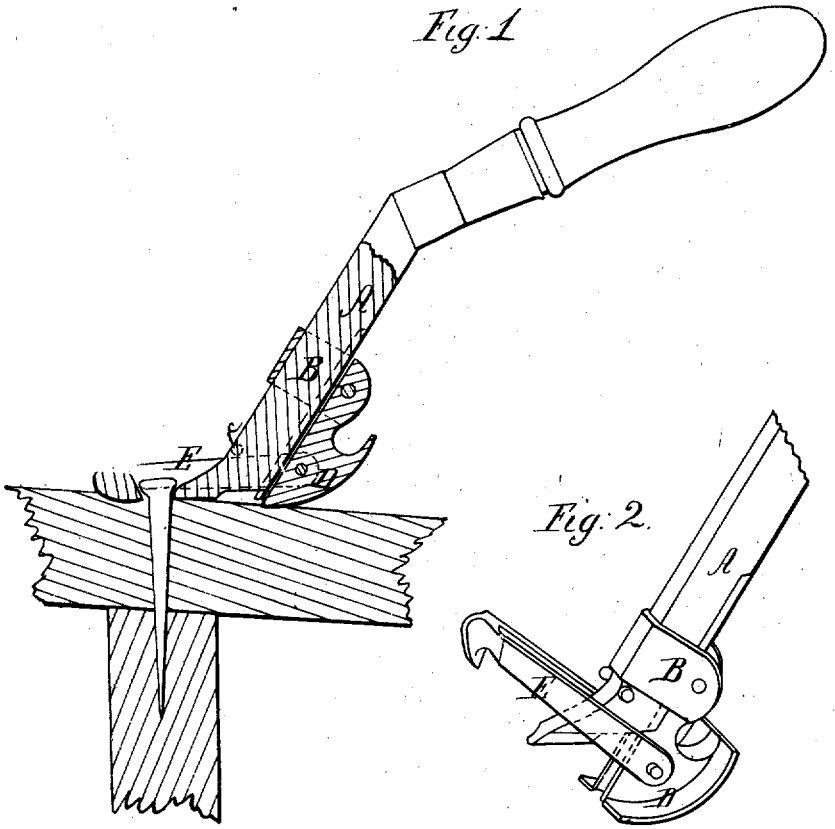
Figure 1 is a longitudinal section of the nail-extractor.
Figure 2 is a perspective view.

In the construction of this nail-extractor, three principal pieces are used.

The first piece, A, is a bar, (which it is preferable to make flat, to economize material and strength,) having, at its lower end, a projecting point, *a*, and, above this point, a pin, *c*, projecting on each side of the bar.

At the upper end of the bar is fitted a common form of handle.

Surrounding the bar A, is a sliding clasp, B, which fits snugly to the bar, and has attached to it a rocker-fulcrum, D.

To this fulcrum is pivoted a slotted hook, E, which passes around the bar A, beneath the pin *c*, and has a point, which is curved downward.

The operation of the machine is as follows:

The point A is forced into the wood, on one side of the nail to be drawn, the tool being held nearly perpendicular to the surface of the wood, so that the point shall have a firm bearing against the head of the nail, as on the firmness of this bearing depends the proper operation of the hook E.

It is obvious that, when the lever A is forced back, the operation of the sliding fulcrum B D, hook E, and pin *c*, will compel the hook to cut through the wood, and force itself under the head of the nail, provided the point *a* be held firmly in its position against the head of the nail; but it is also obvious that the same force which tends to force the hook E into the wood, and under the head of the nail, tends also to force the point *a* upward. Consequently, in constructing this machine, care must be taken to give a proper shape to the point *a* and hook E, to make the various parts of the machine of proper relative proportions, and place the pin *c* correctly, in order to produce a machine capable of the best operation. These matters are, however, within the knowledge of the skilled mechanic, and need no further description.

What we claim as new, and desire to secure by Letters Patent, is—

The combination of the lever A, sliding fulcrum B D, and hook E, substantially as and for the purpose specified.

JNO. VD. BOGERT.
JOHN F. LOWELL.

Witnesses:
J. E. MAYNADIER,
CHAS. F. SLEEPER.